(No Model.)
J. H. IRION.
END BOARD CHUTE FOR WAGONS.
No. 526,971. Patented Oct. 2, 1894.
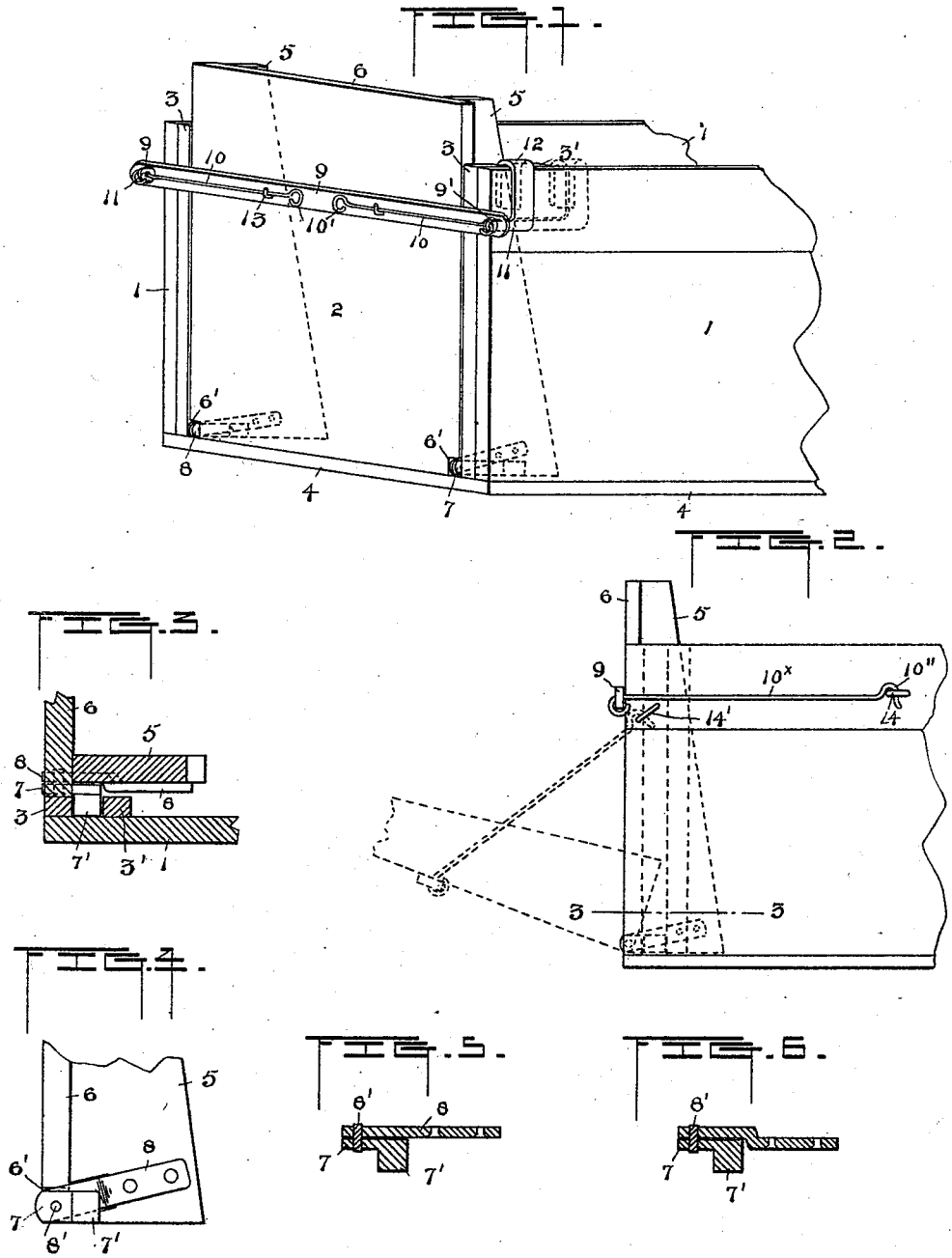
Witnesses
Arch. M. Catlin
Frances H. Catlin
Inventor
John H. Irion
by
Benj. R. Catlin Attorney

UNITED STATES PATENT OFFICE.

JOHN H. IRION, OF TABLE ROCK, NEBRASKA.

END-BOARD CHUTE FOR WAGONS.

SPECIFICATION forming part of Letters Patent No. 526,971, dated October 2, 1894.

Application filed March 28, 1894. Serial No. 505,447. (No model.)

*To all whom it may concern:*

Be it known that I, JOHN H. IRION, a resident of Table Rock, in the county of Pawnee and State of Nebraska, have invented certain new and useful Improvements in End-Board Chutes for Wagons; and I do hereby declare the following to be a full, clear, and exact description of the invention, such as will enable others skilled in the art to which it pertains to make and use the same.

The invention relates to detachable end board chutes for wagons, and has for its object to simplify their construction and increase the holding capacity of the wagon box and the reach of the chute, and the invention consists in the construction hereinafter described and particularly pointed out.

In the accompanying drawings, Figure 1 is an isometric view of a section of a wagon box with the improvement applied thereto. Fig. 2 is a partial side elevation showing a modified detail. Fig. 3 is a section on line 3—3 of Fig. 2. Fig. 4 is a view of a modified detail. Figs. 5 and 6 are sections of details.

Numeral 1 denotes a wagon box or body and 2 a detachable chute adapted to be substituted at will for the usual end board.

3, 3' are the ordinary end board cleats and 4 the floor of the wagon box.

5 denotes the sides of the chute and 6 its bottom. This closes the end of the wagon body at its extreme rear end and in a plane between the rear cleats 3. This is effected by the improved pivotal connections consisting of two horizontal arms 7 each provided with a lateral angular extension 7' adapted to be easily entered in the groove or space between the cleats 3, 3'. This extension is prevented from turning in its seat at the bottom of the groove by its angular form. In the rear end of the arm 7 is a bearing for a pivot 8' said pivot being fast on an arm 8 which is fixed to the chute. By this means the device can be connected to a wagon body of usual form and used either to close its end or as a chute in loading or unloading grain or other material. To provide space for the pivoted or hinged arms 7 and 8 the chute bottom 6 may be cut away at 6' and the side of the chute secured to said bottom a short distance from its edge as indicated in Fig. 1. By such construction the chute bottom is adapted to entirely fill and close the wagon box in a plane passing through the cleats 3. This situation of the chute acting as an end board enlarges the usual capacity of the wagon box and also increases the reach of the chute when used in that capacity. By suitably offsetting the arms 8 as indicated in Figs. 3, 4 and 6 and slightly notching the sides of the chute to receive them, said sides can be supported and moved in close proximity to the cleats.

To support the chute in either its raised or lowered position a bar 9 is attached thereto that is longer than the width of the body and provided with holes 9' near the ends for the free passage when desired of the supporting and holding rods 10. These rods are loosely connected to the free ends of the horizontal members 11 of bracket hooks, the hook or suspending member thereof being denoted by 12. These are adapted to embrace and rest upon the wagon box sides at the rear of the cleats 3, 3', or between them if made in suitable dimensions. The holes 9' are made large enough to receive the free ends of arms 11. The pivoted rods 10 have heads, cross bars or loops 10' made too large to be passed through said holes 9'. By means of the rods thus provided with heads and pivoted to the brackets the bar 9 and the chute can be supported when lowered to the position indicated by the dotted lines in Fig. 2. When the chute is vertical and acts as an end board the rods are placed in hooks 13. At such times the wagon box is held against spreading by the bar 9 and the arms 11.

It is obvious that the bracket hooks might be made continuous with the extension 7' of arm 7 as heretofore practiced without interfering with the improved construction whereby the chute is situated at the extreme end of the box and the bar 9 extended beyond its sides.

In some cases rods such as $10^{\times}$, see Fig. 2, may be pivotally connected to the ends of bar 9 and provided with hooks 10'' adapted to engage staples 14 or 14' fixed in the wagon box, the situation of said staples corresponding to the two operative positions of the end board chute. In such construction the bar 9 and the rods 10 co-operate to hold the wagon box sides together.

I am aware that an end gate adapted to embrace the exterior of a wagon body has been pivotally supported upon slotted brackets secured to said body and extended below its bottom and combined with jointed operating levers adapted to support the end board in an operative position as a chute and I do not broadly claim such device, nor an end board chute situated at the end of the box. Neither do I claim broadly removable end board chutes whether combined with the ordinary wagon body cleats or not.

Having thus described my invention, what I claim is—

1. In combination the end board chute situated at the extreme rear end of the wagon box, said box having cleats, the arms 8 secured to the sides of the chute, the arms 7 pivoted to arms 8 and having extensions 7', bar 9 and hooks 12 mediately connecting said bar and box and adapted to be hung on the edges of the latter, the entire construction being supported without fastenings upon said box, substantially as set forth.

2. In combination, the end board chute of a wagon box, the bar 9 secured to the chute and made longer than the width of the box and devices consisting of hooks 12 having arms 11 and rods 10 supported upon and situated outside said box adapted to engage and hold the bar and chute either in a raised or lowered position, said arms 11 entering holes 9' in the bar when the chute is raised to obviate the spreading of the box, substantially as set forth.

In testimony whereof I have signed this specification in the presence of two subscribing witnesses.

JOHN H. IRION.

Witnesses:
F. A. HARRISON,
R. H. WESSEL.